(12) United States Patent
Albada

(10) Patent No.: US 12,241,748 B2
(45) Date of Patent: Mar. 4, 2025

(54) SEQUENTIAL LOCATION TRACE CLUSTERING

(71) Applicant: Uber Technologies, Inc., San Francisco, CA (US)

(72) Inventor: Michael Charles Albada, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 637 days.

(21) Appl. No.: 17/305,854

(22) Filed: Jul. 15, 2021

(65) Prior Publication Data

US 2022/0018665 A1 Jan. 20, 2022

Related U.S. Application Data

(60) Provisional application No. 62/705,811, filed on Jul. 16, 2020.

(51) Int. Cl.
*G01C 21/34* (2006.01)
*G06F 16/28* (2019.01)
*G06Q 10/047* (2023.01)

(52) U.S. Cl.
CPC ....... *G01C 21/3415* (2013.01); *G06F 16/285* (2019.01); *G06Q 10/047* (2013.01)

(58) Field of Classification Search
CPC .............. G01C 21/3415; G06F 16/285; G06Q 10/047; G06Q 50/40; G06Q 30/0201
See application file for complete search history.

(56) References Cited

U.S. PATENT DOCUMENTS

| 10,036,641 | B1 * | 7/2018 | Iland | H04W 4/02 |
| 2009/0030600 | A1 * | 1/2009 | Liu | G01C 21/3415 |
| | | | | 701/533 |
| 2010/0332121 | A1 * | 12/2010 | Okude | G01C 21/3415 |
| | | | | 701/533 |

(Continued)

OTHER PUBLICATIONS

Guralnik, Valerie, et al., "A scalable algorithm for clustering sequential data", Proceedings 2001 IEEE international conference on data mining. IEEE, (2001).

(Continued)

*Primary Examiner* — Khoi H Tran
*Assistant Examiner* — Nhi Q Bui
(74) *Attorney, Agent, or Firm* — Schwegman Lundberg & Woessner, P.A.

(57) ABSTRACT

Systems and methods for generating and presenting an optimized path using sequential location trace clustering is provided. The system receives a request for a transportation service from a client device of a user. The request indicates a destination point (i.e., a pickup location) and is associated with a start point (i.e., a location at a time the user requested the transportation service). Based on the start point and destination point, the system identifies one or more paths between the start point and the destination point, whereby the one or more paths are generated using sequential location trace clustering from previous transportation services involving the start point and the destination point. The system then causes presentation of a path of the one or more paths on a user interface on the client device of the user with which the user can use to navigate to the destination point.

17 Claims, 7 Drawing Sheets

(56) References Cited

U.S. PATENT DOCUMENTS

| | | | | |
|---|---|---|---|---|
| 2013/0204528 | A1* | 8/2013 | Okude | G01C 21/3492 |
| | | | | 701/533 |
| 2014/0336918 | A1* | 11/2014 | Wan | G01C 21/3446 |
| | | | | 701/400 |
| 2015/0100231 | A1* | 4/2015 | Weir | G01C 21/3641 |
| | | | | 701/400 |
| 2015/0262397 | A1* | 9/2015 | Eastman | G06F 18/23 |
| | | | | 345/440 |
| 2018/0348010 | A1* | 12/2018 | Coleman | G01C 21/3453 |
| 2018/0372503 | A1* | 12/2018 | Bagchi | G06N 20/00 |
| 2019/0285422 | A1* | 9/2019 | Opitsch | G01C 21/3852 |

OTHER PUBLICATIONS

Johnson, Stephen C., "Hierarchical clustering schemes", Psychometrika 32.3, (1967), 241-254.

Kumar, Pradeep, et al., "Rough clustering of sequential data", Data & Knowledge Engineering 63.2, (2007), 183-199.

Macqueen, James, "Some methods for classification and analysis of multivariate observations", Proceedings of the fifth Berkeley symposium on mathematical statistics and probability. vol. 1. No. 14, (1967), 281-297.

Panuccio, Antonello, et al., "A Hidden Markov Model-based approach to sequential data clustering", Structural, Syntactic, and Statistical Pattern Recognition: Joint IAPR International Workshops SSPR 2002 and SPR 2002 Windsor, Ontario, Canada, Aug. 6-9, 2002 Proceedings, (2002), 10 pgs.

\* cited by examiner

SEQUENTIAL LOCATION TRACE CLUSTERING

CLAIM FOR PRIORITY

This application claims the benefit of priority of U.S. Application Ser. No. 62/705,811, filed Jul. 16, 2020, which is hereby incorporated by reference in its entirety.

TECHNICAL FIELD

The subject matter disclosed herein generally relates to generating and presenting optimized paths to a destination. Specifically, the present disclosure addresses systems and methods that generate and present one or more optimized paths from a common start point to a common destination using sequential location trace clustering.

BACKGROUND

It is important, in a transportation service, for a user to be able to find their way to a destination. For example, a rider in a ride sharing service will need to find the pickup location for their ride, and a courier for a delivery service will need to navigate to a location to pick up an item for delivery (e.g., a restaurant) and/or navigate to a delivery address. In complex locations, the destinations may not be a simple straight line from a start point or current location of the user. In these situations, it is usually left up to the user to find their own way to the destination (e.g., reading signs, asking for directions). This can be challenging in unfamiliar contexts when users are traveling or couriers make deliveries in new areas, and can result in suboptimal experiences and wasted time for users.

BRIEF DESCRIPTION OF THE DRAWINGS

Some embodiments are illustrated by way of example and not limitation in the figures of the accompanying drawings.

DETAILED DESCRIPTION

Figure 1:
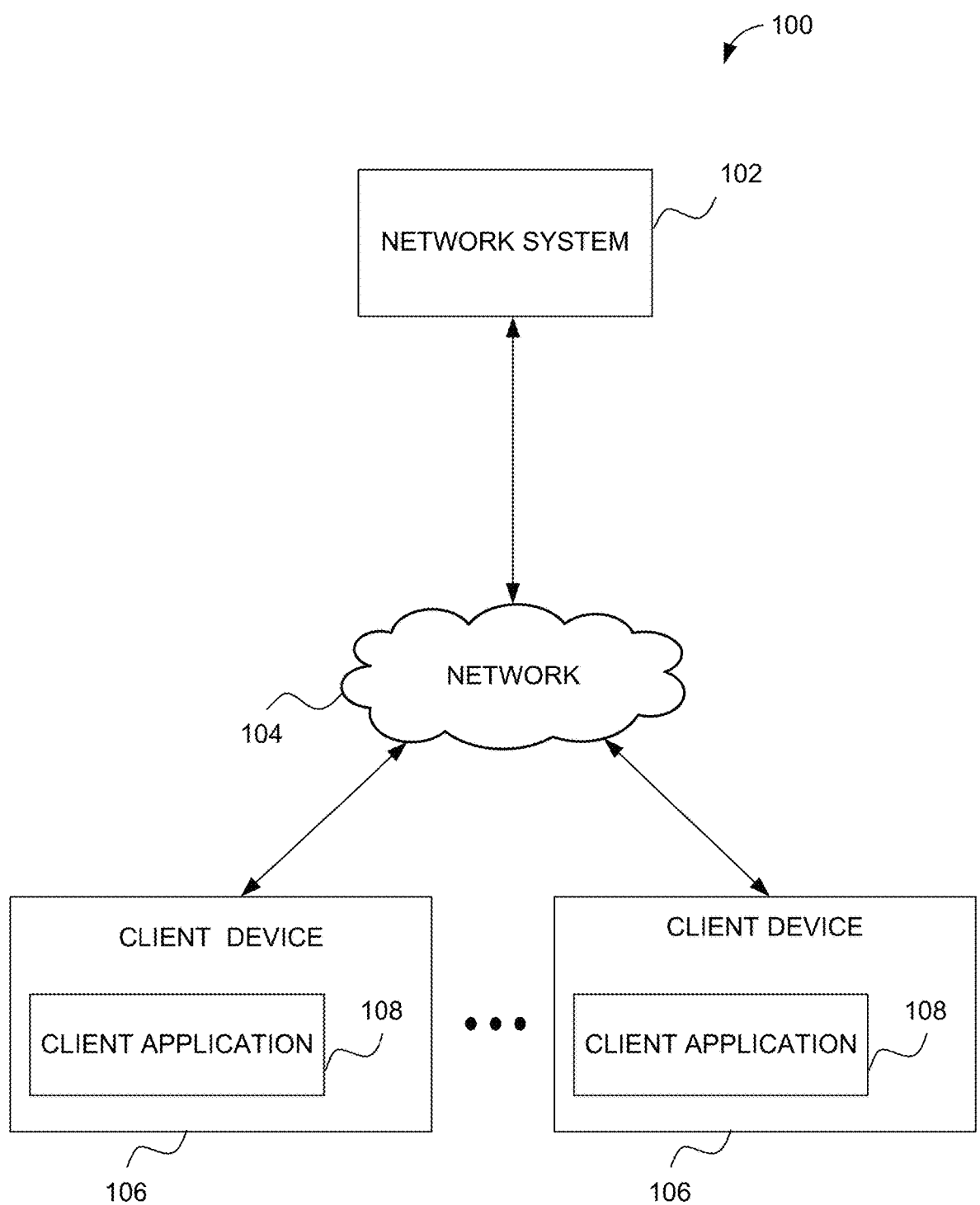
FIG. 1 is a diagram illustrating a network environment suitable for generating paths to a destination using sequential location trace clustering and providing navigation to the destination, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for generating and providing navigable paths from a common start point to a common destination using sequential location trace clustering and providing navigation (e.g., a navigable walking path) to the common destination. In one use case, the common destination is a pickup point for a ride sharing service and the navigation comprises a path for a rider to reach the pickup point. For example, a common start point for the ride sharing service may be baggage claim at an airport and a common destination is a ride sharing pickup area outside a terminal. In an alternative courier user case, the destination is a pickup location for an item (e.g., a restaurant inside a mall) and the navigation comprises a path for a courier or delivery person to navigate to the pickup location to obtain the item to be delivered. In another case, the destination may be a delivery location for the item (e.g., a delivery point within a large complex) and the navigation comprises a path to the delivery location. In this last example, conventional systems typically only map to the general address of the delivery location such as a large residential complex, and it is left to the courier to find their way to a particular unit or delivery point.

Traditionally, the only guidance provided to riders or couriers to reach the common destination is a straight dotted line between their current location and the destination on a displayed map. This does not factor in any contextual or location-specific features (e.g., walls, stairs, crosswalks, tunnels, or sky bridges). While this may be sufficient in simple cases, it does not provide adequate guidance for riders in large or complex environments such as airports or cases where riders have to follow a long or circuitous path to the destination.

Conventionally, existing algorithms are designed for clustering generic sequential data and are poorly optimized for location data. In contrast, example embodiments allow for the generation of high-quality polylines (e.g., navigable paths) that are useful in multiple contexts. For instance, example embodiments can provide suggested walking paths from a common start point to common destinations based on historical rider walking paths. This is particularly useful in large venues and airports. Additionally, detailed walking guidance can be provided to couriers in malls or large complexes (e.g., apartment buildings, business buildings). Further still, example embodiments can provide guidance to drivers in areas with poor base map coverage where derived polylines can be integrated into driver navigation.

In example embodiments, a network system performs sequential location trace clustering to generate the navigable paths to the common destination. Accordingly, the network system accesses aggregated data from previous transportation services from a data storage. The network system then clusters origin points and destination points from the aggregated data and assigns location trace data from the aggregated data to their nearest clustered origin point and/or clustered destination point. The location trace data are then grouped by origin-destination pairs. Subsequently, the network system generates the one or more paths between the clustered origin point and clustered destination point for an origin-destination pair.

During runtime, the network system receives a request for transportation service from a client device of a user. The request may indicate a destination point and be associated with a start point. Based on the start point and destination point, the network system identifies one or more paths between the start point and the destination point, whereby the one or more paths are generated using sequential location trace clustering from previous transportation services involving the start point and the destination point. The network system then causes presentation of a path of the one or more paths on a user interface on the client device of the user.

Thus, example methods (e.g., algorithms) and example systems (e.g., special-purpose machines) are configured to generate optimized navigable paths from a common start point to a common destination using historical data by applying sequential location trace clustering techniques. The results are highly detailed paths that take into consideration contextual or location-specific features. As such, one or more of the methodologies described herein facilitate solving the technical problem of generating and presenting detailed navigation to common destinations.

FIG. 1 is a diagram illustrating a network environment 100 suitable for generating and presenting optimized navigable paths to a common destination using sequential location trace clustering and providing navigation to the common destination, in accordance with example embodiments. The network environment 100 includes a network system 102 communicatively coupled via a network 104 to a plurality of client devices 106 of users. The users may include riders and service providers (e.g., drivers, couriers, or delivery persons). In example embodiments, the network system 102 comprises components that obtain, store, and analyze data received from the client devices 106 from previous transportation services (also referred to as "trips") in order to generate navigable paths to common destinations identified from the data. The navigable paths may comprise paths that are complex to navigate (e.g., not a straight line) between a start or current location of a user to the common destination. During runtime, the network system 102 may select and provide one or more of the navigable paths to a requesting user. The components of the network system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the client devices 106 are portable electronic devices such as smartphones, tablet devices, wearable computing devices (e.g., smartwatches), or similar devices. The client devices 106 each comprises one or more processors, memory, touch screen displays, wireless networking system (e.g., IEEE 802.11), cellular telephony support (e.g., LTE/GSM/UMTS/CDMA/HSDPA), and/or location determination capabilities. The client devices 106 interact with the network system 102 through a client application 108 stored thereon. The client application 108 of the client devices 106 allow for exchange of information with the network system 102 via user interfaces, as well as in background. For example, the client applications 108 running on the client devices 106 may determine and/or provide location information of the client devices 106 (e.g., current location in latitude and longitude), via the network 104, for storage and later analysis. In example embodiments, the location information, which is timestamped, is used by the network system 102 for sequential location trace clustering to generate navigable paths, as will be discussed in more details below.

In example embodiments, users (e.g., riders) operates the client device 106 that executes the client application 108 to communicate with the network system 102 to make a request for a transportation service such as transport or delivery service. The client application 108 determines or allows the user to specify/select a pickup location (e.g., of the user or an item to be delivered) and to specify a drop-off location for the trip. In the ride sharing embodiment, the client device 106 provides location traces as the user navigates from a point where the request was made for the transportation service to the pickup location (or common destination). In the courier embodiment, the client device 106 provides location traces as the courier navigates from their vehicle (e.g., start location is a parking lot) to the pickup location and/or delivery location for the item. Each location trace comprises location information (e.g., latitude/longitude information) along with a timestamp. For example, the location trace can indicate that at time0, the user is at baggage claim (lat1/long1); at time1, the user is 10 meters from baggage claim (lat2/long2); at time2, the user is 20 meters from baggage claim (lat3/long3); and so forth. The location traces can be obtained from various sensors such as a global positioning system (GPS) receiver, a short-range wireless input (e.g. Bluetooth), and/or a local area networking receiver (e.g. Wi-Fi).

The client application 108 also presents information, from the network system 102 via user interfaces, to the user of the client device 106. For instance, the user interface can display a navigable path to the common destination that was determined using sequential location trace clustering.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of client devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the client device 106 may be embodied within the network system 102. While only a single network system 102 is shown, alternative embodiments may contemplate having more than one network system 102 to perform server operations discussed herein for the network system 102.

Figure 2:
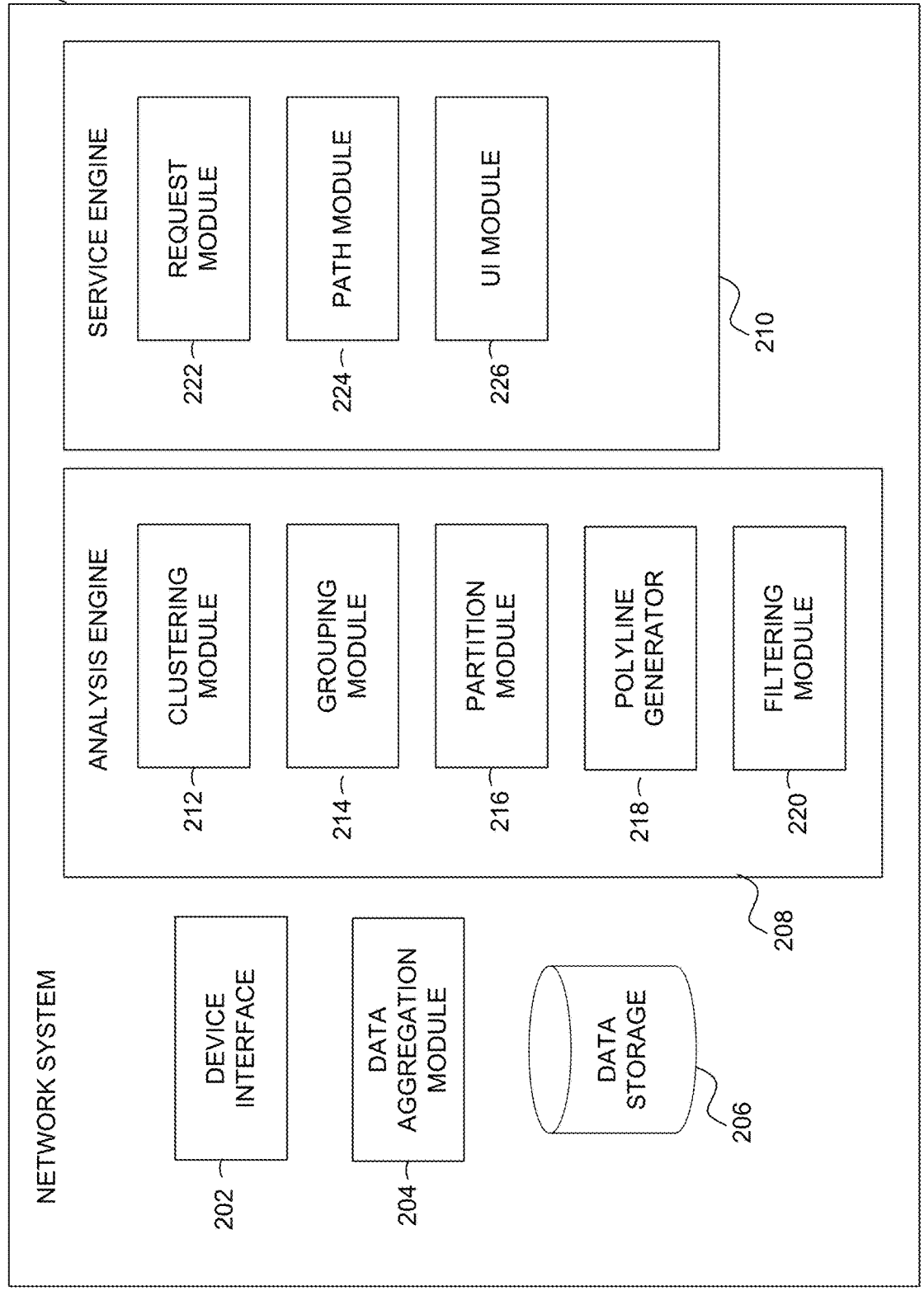
FIG. 2 is a block diagram illustrating components of a network system for generating the paths to the destination and providing the navigation, according to some example embodiments.

FIG. 2 is a block diagram illustrating components of the network system 102, according to some example embodiments. In various embodiments, the network system 102 obtains and stores data (e.g., pickup and drop-off locations, location trace data) received from the client devices 106 during trips, analyzes the data (e.g., location trace data) to generate paths that summarize the underlying data. During runtime, the network system 102 accesses the generated paths and provides one or more of the paths to the client device 106. To enable these operations, the network system 102 comprises a device interface 202, a data aggregation module 204, a data storage 206, an analysis engine 208, and a service engine 210 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the client devices 106 and cause presentation of one or more user interfaces provided by the network system 102 on the client devices 106 (e.g., via the client application 108) including user interfaces to initiate a request for transportation service, select a pickup location, and display a route or path to navigate to the pickup location (e.g., the common destination).

The data aggregation module 204 is configured to aggregate trip data received from the client devices 106. The trip data can include location traces (e.g., latitude and longitude with timestamp), speed, times associated with each trip, and cost for the transportation service. The trip data may be received from the client device 106 in real-time as the user is traveling (or navigation to a pickup point) during a trip. The trip data is stored to the data storage 206 by the data aggregation module 204.

The data storage 206 is configured to store information associated with each user of the network system 102 including the aggregated trip data. The information includes various trip data used by the network system 102 for sequential location trace clustering and generation of navigable paths to common destinations. In some embodiments, the data is stored in or associated with a user profile corresponding to each user and includes a history of interactions with the network system 102 (e.g., past trip data). While the data storage 206 is shown to be embodied within the network system 102, alternative embodiments can locate the data storage 206 elsewhere and be communicatively coupled to the network system 102.

The analysis engine 208 comprises components that stitch together arbitrary numbers of location trace sequences into polylines that summarize the underlying data. Each polyline is an ordered list of points which are defined by two floating point values, one each for latitude and longitude (e.g., from the location trace data). Optimized polylines result in navigable paths to common destinations that may be presented to users. In order to generate the polylines, the analysis engine 208 comprises a clustering module 212, a grouping module 214, a partition module 216, a polyline generator 218, and a filtering module 220.

The clustering module 212 clusters origin points (also referred to herein as "start points") and destination points. As such, the clustering module 212 access the trip data (e.g., location traces) from the data storage 206 and identifies the origin points and destination points for various trips. Each location trace comprises a sequence of location estimates for a single rider with each location estimate having a corresponding timestamp. In a ride sharing embodiment, an origin point is a location of the user when a request for transportation service is initiated and a destination point is a pickup location (e.g., where to meet a driver). In a courier embodiment, the origin point may be a parking location and the destination point may be a location from where an item to be delivered can be picked up or to where the item is to be dropped off. In various embodiments, the clustering module 212 can use, for example, DB SCAN, K-means clustering, or hierarchical clustering. It is noted that any clustering technique can be used in various embodiments.

In some embodiments, the clustering module 212 also probabilistically clusters location estimates, weighted by their horizontal accuracy, within partitions generated by the partition module 216. This process identifies distinct pathways between origins and destinations to be used as constituent components of the final polylines. Location estimates comprise a point (as defined above) along with a floating point representing a horizontal accuracy of the location estimate.

The grouping module 214 assigns the location traces to their nearest clustered origin and destination point. In assigning the location traces, the grouping module 214 discards any location traces that are more than a predetermined distance from an origin cluster or a destination cluster. In one embodiment, the predetermined distance is 25 meters. Discarding outlier location traces takes into consideration that there can be noise in the measurements. Also, users may have taken wrong turns or gotten lost in the past.

The grouping module 214 then groups the location traces by origin-destination pairs. For example, all location traces from origin A to destination B are grouped together, while all location traces from origin C to destination B are grouped together.

The partition module 216 splits the space between the origin and destination points in an origin-destination pair into partitions. The partition module 216 may partition the space between the origin and the destination points by drawing orthogonal planes through a line segment connecting the origin and the destination points at every predetermined partition size. Depending on the complexity of the route and the accuracy of the location estimates, the predetermined partition size can range between one and one hundred meters (with 20 meters used in accordance with one embodiment).

The polyline generator 218 is configured to "connect the dots" between the clusters within each partition to generate the polylines or paths. As such, polylines are ordered lists of the points.

The filtering module 220 applies filtering to the polylines to ensure the polylines are sufficiently coherent and distinct. In one embodiment, the filtering uses two parameters: a minimum distance in meters and a percentage of partitions that must meet the distance criterion. The filtering compares the within-partition distances between polylines for given origin-destination pairs. If the distance between the within-partition clustered points for two polylines is not greater than the minimum distance for the specified number of partitions, then one of the polylines is dropped.

The service engine 210 is configured to provide navigable paths (e.g., optimized polylines) during runtime. Accordingly, the service engine 210 comprises a request module 222, a path module 224, and a user interface (UI) module 226. The service engine 220 may comprise other components (not shown) for managing a transportation service including assigning service providers (e.g., drivers, couriers) to a transportation service request and providing routes to a drop off location associated with the transportation service request.

The request module 222 manages the transportation service request. In example embodiments, the request module 222 receives the transportation service request from a user and determines a pickup location associated with the transportation service request. In example embodiments, the pickup location is the destination point. Additionally, the request module 222 may also receive a current or requesting location of the user. The current/requesting location may be the origin point.

The path module 224 is configured to determine one or more paths or polylines to provide to the client device 106 of the user to guide the user to the destination (or destination point). In some embodiments, the path module 224 identifies a plurality of polylines between the user's starting point and destination and ranks the polylines to identify a top number to return to the user (e.g., a top three paths). The top number of paths may be chosen, for example, based on a predetermined criterion, such as the most popular paths, shortest distance, fastest routes, or other criteria. In some cases, the criterion may be personalized to the user (e.g., stored preference in their profile).

In some embodiments, the request module 222 may also monitor the user as their traverse the navigable path. In these embodiments, the path module 224 may determine updated paths should the user deviate from a current navigable path.

The UI module 226 causes display of the one or more paths determined by the path module 224 at the client device 106. In some embodiments, the UI module 226 transmits instructions that cause the display of one of the paths in a user interface on the client device 106.

Figure 3:
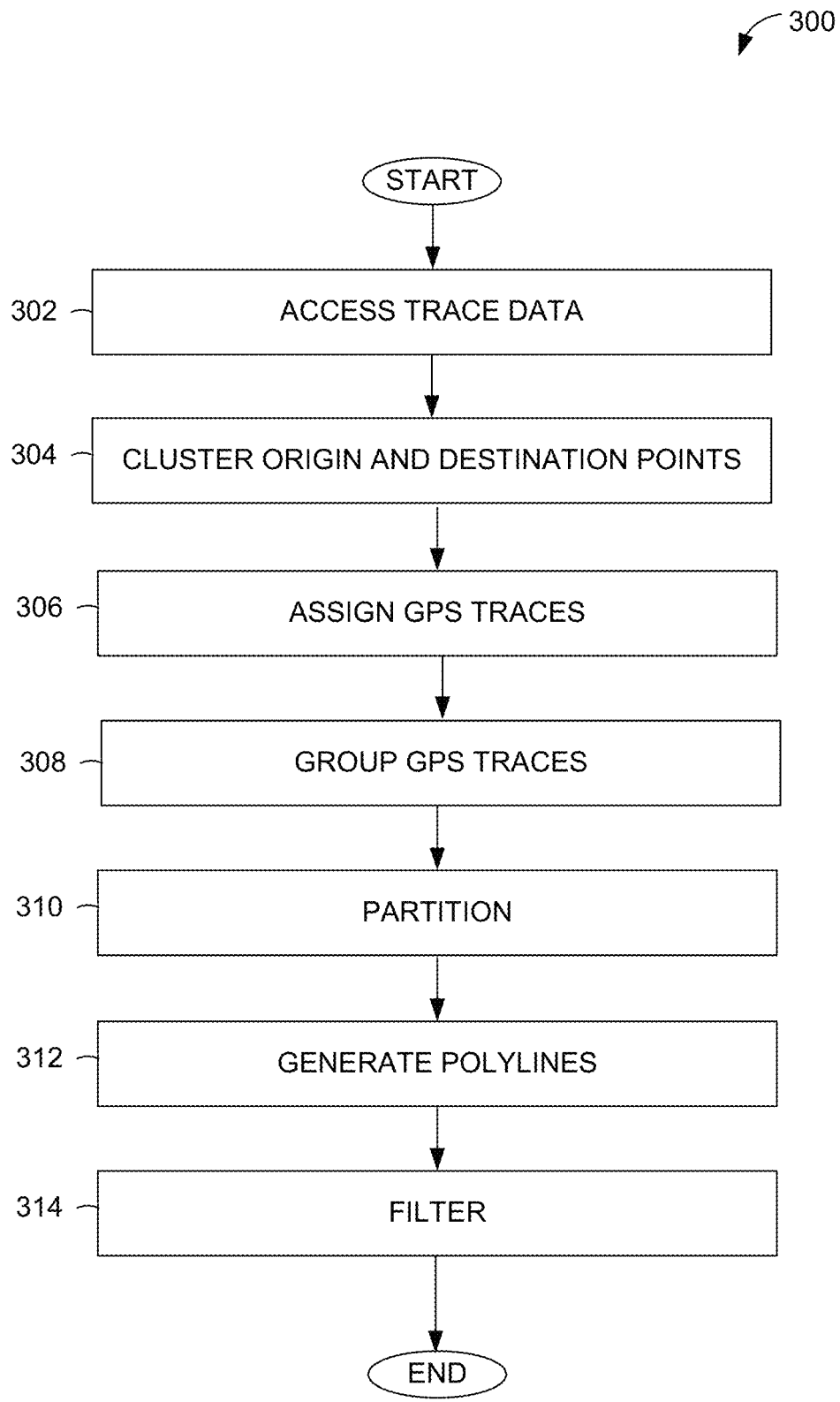
FIG. 3 is a flowchart illustrating operations of a method for using sequential location trace clustering to generate one or more paths to the destination, according to some example embodiments.

FIG. 3 is a flowchart illustrating operations of a method 300 for using sequential location trace clustering to generate one or more paths to the common destination, according to some example embodiments. Operations in the method 300 may be performed by the network system 102, using components described above with respect to FIG. 2. Accordingly, the method 300 is described by way of example with reference to the network system 102. However, it shall be appreciated that at least some of the operations of the method 300 may be deployed on various other hardware configurations or be performed by similar components residing elsewhere in the network environment 100. Therefore, the method 300 is not intended to be limited to the network system 102. The operations of the method 300 of FIG. 3 can occur at any time, at predetermined times or intervals (e.g., every night, once a week), when a predetermined amount of location trace data has been stored, or based on other factors.

In operation 302, the clustering module 212 accesses location trace data stored from a plurality of past trips of a plurality of users. Each location trace of the location trace data comprises a sequence of location estimates for a single user of the plurality of users with each location estimate having a corresponding timestamp. Each location trace will be associated with a start point or origin and a destination (e.g., pickup location).

In operation 304, the clustering module 212 clusters the location trace data by origin points and destination points. As such, the clustering module 212 identifies each origin point and destination point from the location trace data. In a ride sharing embodiment, an origin point is a location of the user when a request for transportation service is initiated and a destination point is a pickup location (e.g., where to meet a driver). In a courier embodiment, the origin point may be a parking location and the destination point may be a location where an item to be delivered can be picked up from or dropped off at.

In operation 306, the grouping module 214 assigns location traces to their nearest clustered origin and clustered destination. In assigning the location traces, the grouping module 214 discards any location traces that are more than a predetermined distance from an origin cluster or a destination cluster. In one embodiment, the predetermined distance is 25 meters. Discarding outlier location traces takes into account that there can be noise in the measurements. Also, users may have taken wrong turns or gotten lost in the past; these location traces are removed from consideration.

In operation 308, the grouping module 214 groups location traces by origin-destination pairs. For example, all location traces from origin A to destination B are grouped together, while all location traces from origin C to destination B are grouped together. In some embodiments, operations 306 and 308 can be combined into a single operation.

In operation 310, the partition module 216 partitions the space between the clustered origin and clustered destination for each origin-destination pair. The partition module 216 may partition the space between the origin and the destination by drawing orthogonal planes through a line segment connecting the origin and the destination points at every predetermined partition size.

In operation 312, the polyline generator 218 generates polylines between the origin and destination for each origin-destination pair. In essence, the polyline generator 218 connects the dots between clusters within each partition. In one embodiment, the polyline generator 218 partitions the space by drawing orthogonal planes between the origin and destination. Location estimates that fall within the partition are clustered. The polyline generator 218 then stitches together the clustered point in each partition with the closest clustered point in the adjacent partition. In essence, this process identifies a path as a sequence of locally optimized cluster centroids across all of the location traces with that common original and destination.

In operation 314, the filtering module 220 applies filtering to ensure the polylines generated in operation 312 are sufficiently coherent and distinct. The filtered polylines are then stored (e.g., in the data storage 206) for use during runtime.

In example embodiments, operations 302-314 may occur at any time. For example, the generation and filtering of the polylines can occur at a predetermined time (e.g., nightly), when a certain amount of trip data or location trace data has been aggregated, or be triggered manually by an operator of the network system 102.

In one example embodiment, an algorithm corresponding to the method 300 can be as follows. Input includes: a set of location traces (X), minimum distance threshold (minDist), maximum distance threshold (maxDist), number of samples to draw for each location estimate (nSamples), and size of the sequential partition (partitionSize). The output is a set of polylines. A LocationEstimate is a point (e.g., an object defined by two floating point values—one each for latitude and longitude) along with a floating point value representing a horizontal accuracy of the location estimate. A LocationSequence is an ordered list of LocationEstimates. A polyline is an ordered list of points. As for distance, coordinates are assumed to be in local tangent plane coordinates resulting in distance being the Euclidean L2 Norm distance calculation on the tangent cartesian system. To facilitate distance computations and clustering, points are assumed to be converted into local tangent plane (LTP) coordinates.

```
procedure LocationTraceClustering(X, minDist, maxDist, nSamples,
        partitionSize)
    locationTraceOrigins = first(X)
    locationTraceDestinations = last(X)
    worstAccuracy = max(max(x.horizontalAccuracy) for x in X)
    clusteredOrigins = clusteringAlgorithm(locationTraceOrigins)
    clusteredDestinations = clusteringAlgorithm(locationTraceOrigins)
    groupedX ←Map<key, value>
for each x ∈ X do
        for each o ∈ clusteredOrigins do
            if distance(x, o) < eps:
                for each d ∈ clusteredDestinations do
                    if distance(x, o) < eps:
                        groupedX[(o,d)] = x ∪ groupedX[(o,d)]
finalPolylines = ←Map<key, value>
for each OD ∈ keys(groupedX) do
    L = line segment connecting the origin and destination cluster
    centroids
    locationEstimateSamples = ∅
    for each x ∈ groupedX[OD] do
        sampleRatio = worstHorizontalAccuracy/x.horizontalAccuracy
        do nSamples · e (-sampleRatio) times:
            locationEstimateSamples = sample(x) ∪
            locationEstimateSamples
    samplesByPartition ←Map<key, value>
    for each s ∈ locationEstimateSamples do
        θ = angle between L and the tine segment connecting s and O
        projected_distance = distance( s ,O ) · cos(θ)
        partitionNum ←projected_distance % partitionSize
        samplesByPartition[partitionNum] ← s ∪
        samplesByPartition[partitionNum]
    clustersByPartition ←Map<key, value>
    for each partition ∈ keys(samplesByPartition) do
        clustersByPartition[partition] =
            clustering Algorithm(samplesByPartition[partion])
    polylineCandidates = { }
```

```
    for each parition ∈ keys(clustersByPartition) do
        if polylines is empty
            for each c in clustersByPartition[partition] do
                polylineCandidates ←[c] ∪ polylines
        else
            for each p in polylines do
                for each c in clustersByPartition[partition] do
                    if minDist < distance(c, last(p)) < maxDist:
                        p ←p + c
    polylines= { }
    for each p ∈ polylineCandidates do
        if distance(last(p), D) < max_dist:
            polylines ←[p] ∪ polylines
    finalPolylines[OD] ←polylines
return finalPolylines
```

The probabilistic approach inherently considers the underlying uncertainty of the location estimates. The clustering algorithm also automatically draws more samples from the most accurate location estimates and exponentially fewer samples from the least accurate points. The approach identifies an appropriate number of distinct paths connecting multiple origins and destinations, while including deduplication and smoothing logic to ensure those paths are sufficiently distinct. The algorithm also contains multiple parameters to tune the algorithm to fit the particularities of a range of datasets.

Figure 4:
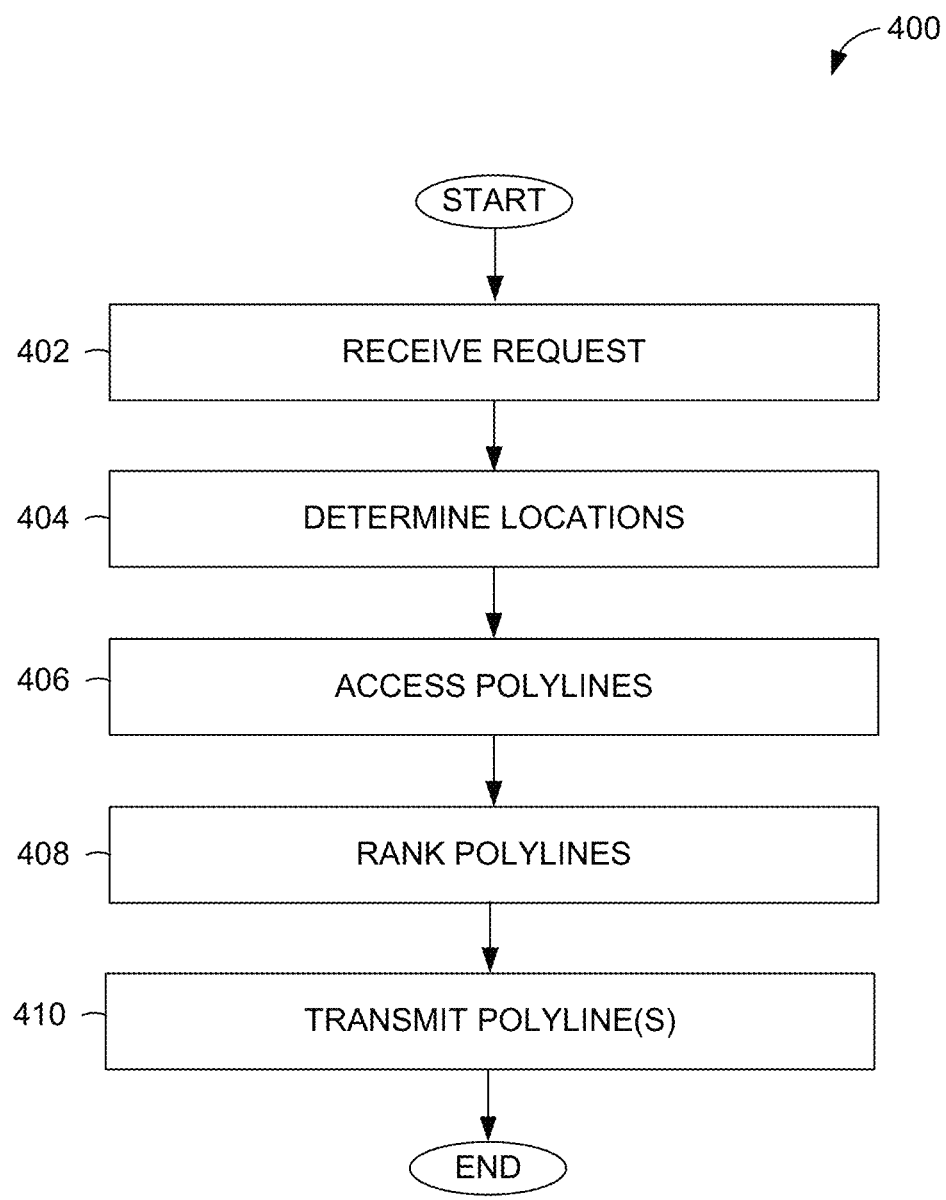
FIG. 4 is a flowchart illustrating operations of a method, at the network system, for providing navigation to the destination, according to some example embodiments.

FIG. 4 is a flowchart illustrating operations of a method 400, at the network system 102, for providing navigation to the common destination, according to some example embodiments. Operations in the method 400 may be performed by the service engine 210 of the network system 102. Accordingly, the method 400 is described by way of example with reference to the service engine 210. However, it shall be appreciated that at least some of the operations of the method 400 may be deployed on various other hardware configurations or be performed by similar components residing elsewhere in the network environment 100. Therefore, the method is not intended to be limited to the service engine 210. The method 400 of FIG. 4 occurs during runtime when a user uses the client application 108 on their client device 106 to request transportation service.

In operation 402, the request module 222 receives a transportation request, from the client device 106, that will result in one or more polylines to be returned to the client device 106. In some embodiments, the transportation request may be a ride sharing transportation request.

In operation 404, the request module 222 determines locations associated with the request. In some embodiments, the determined locations comprise a start location or current location where the request is made and a pickup location, whereby the pickup location is the destination point. The current/start location may be the origin point.

In operation 406, the path module 224 accesses the polylines associated with the origin and destination points (e.g., from the data storage 206). In operation 408, the path module 224 ranks the polylines associated with the origin and destination points to identify a top number to return to the user (e.g., a top three paths). The top number of paths may be chosen, for example, based on being the most popular paths, shortest distance, fastest routes, or other criteria. In some cases, the criterion may be personalized to the user (e.g., the user may prefer the shortest distance).

In operation 410, the UI module 226 transmits one or more of the top ranked polylines (e.g., navigable path) to the client device 106 associated with the transportation request. In some embodiments, the UI module 226 provides instructions that cause the display of the navigable path in a user interface on the client device 106.

Figure 5:
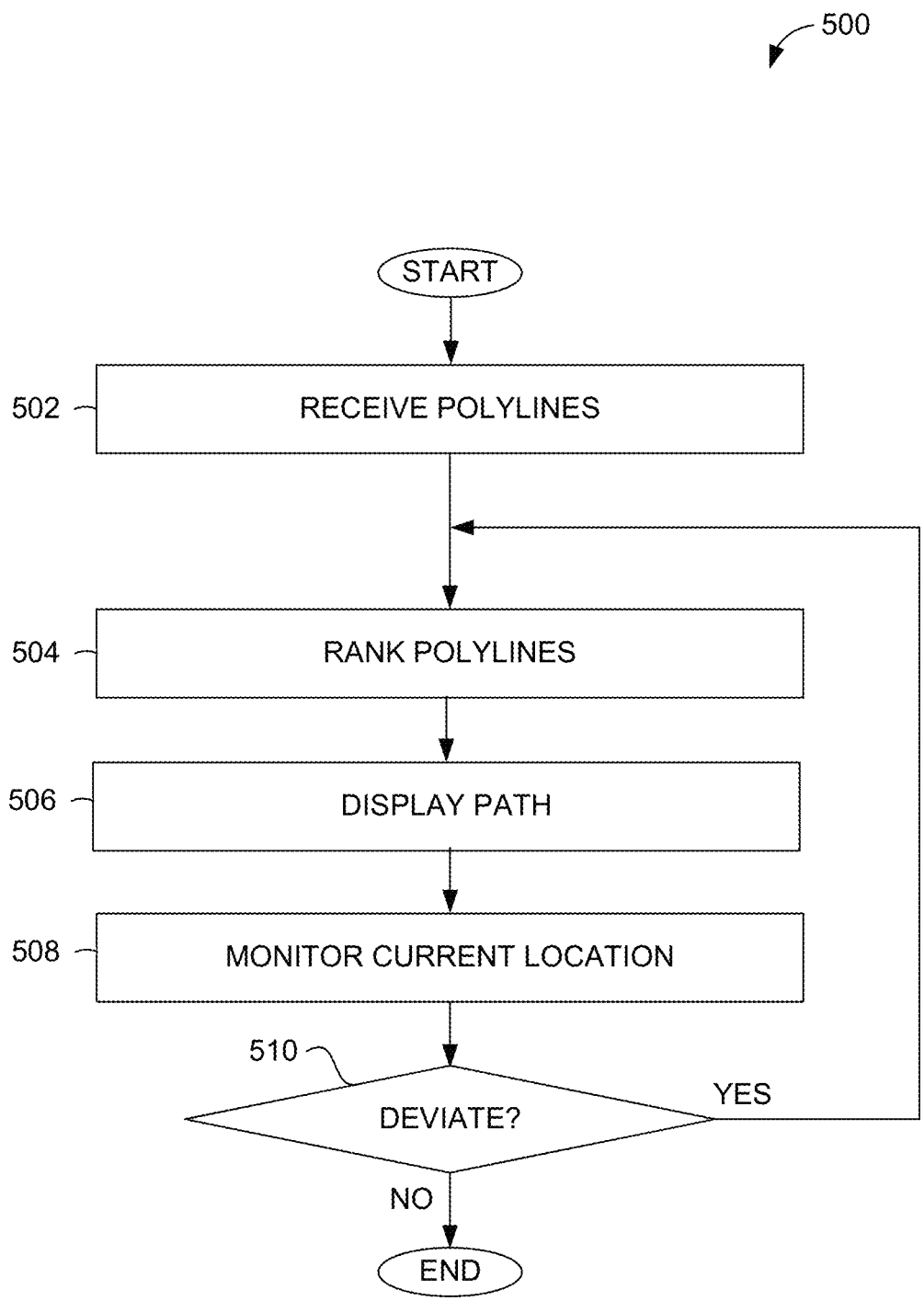
FIG. 5 is a flowchart illustrating operations of a method, at a client device, for providing navigation to the destination, according to some example embodiments.

FIG. 5 is a flowchart illustrating operations of a method 500, at the client device 106, for providing navigation to the service location, according to some example embodiments. Operations in the method 500 may be performed by the client device 106 (e.g., the client application 108 at the client device 106). Accordingly, the method 500 is described by way of example with reference to the client device 106. However, it shall be appreciated that at least some of the operations of the method 500 may be deployed on various other hardware configurations or be performed by similar components residing elsewhere in the network environment 100. For example, some of the operations may be performed by the network system 102. Therefore, the method 500 is not intended to be limited to the client device 102.

The method 500 occurs after the user at the client device 102 has made a transportation service request and accepts a transportation service offered by the network system 102. In operation 502, the client device 102 receives, from the network system 102 (e.g., the UI module 226), the polylines or navigable paths from the origin or start point to the destination (e.g., pickup location).

In operation 504, the client application 108 ranks the polylines in real-time. For instance, the client application 108 identifies the polyline that best matches the user's current location.

Figure 6:
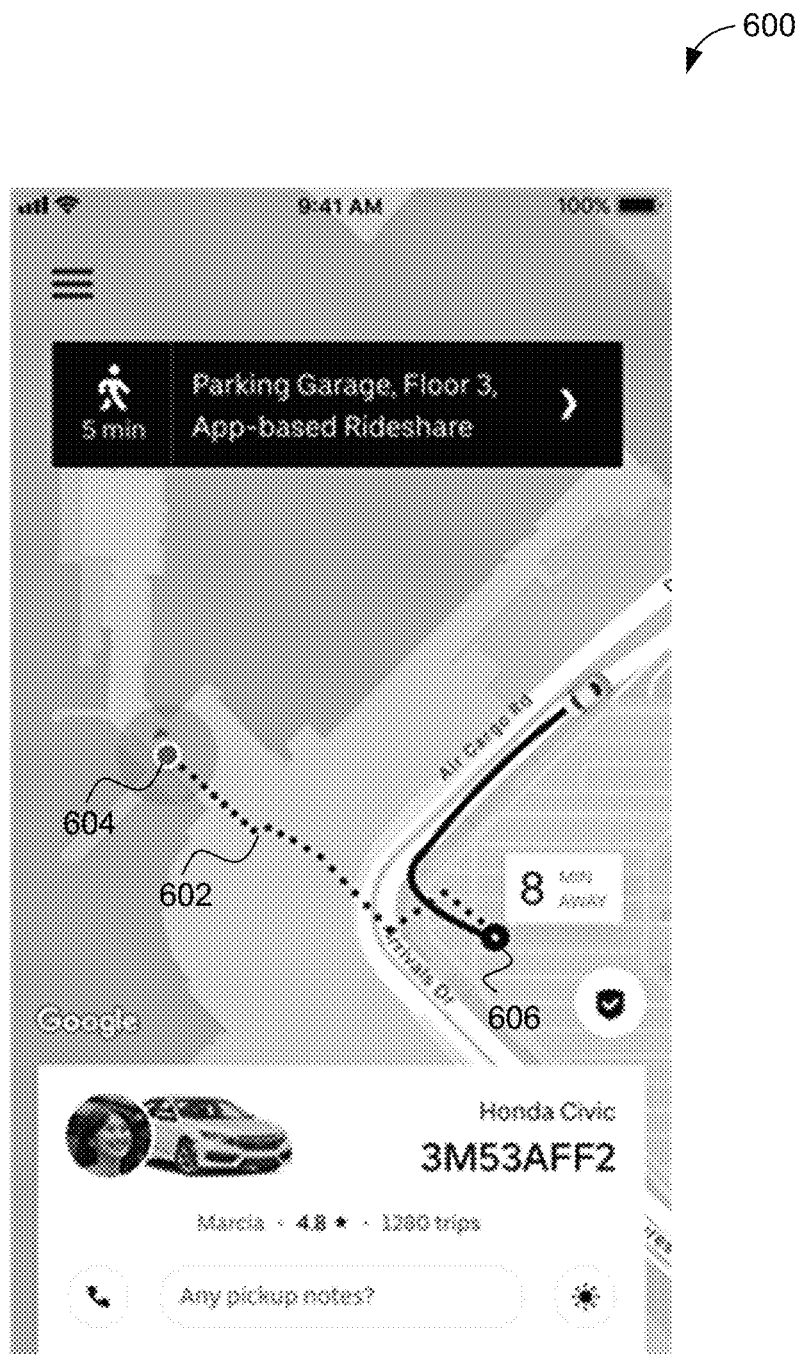
FIG. 6 is an example screenshot of a user interface displaying a navigable path to a destination, according to some example embodiments.

In operation 506, the client application 108 displays the polyline or path (that is top ranked) on a user interface on the client device 106. An example of a display of the path is shown in FIG. 6 below.

The client application 108 monitors the user's current location as the user traverses the path in operation 508 and causes the user interface to update to reflect the user's location on the path. In one embodiment, a Kalman filter can be used to improve on the user's location.

A determination is made in operation 510 whether the user has deviated from the path. If the user deviates from the path in operation 510, the method 500 may return to operation 504 where the polylines are reranked to identify whether a different polyline from the current location to the destination is better. If a different polyline is better, than the path may be subtly changed to reflect the new path to the destination. In some embodiments, if no polylines correspond to the user's current location, the client application 108 may fall back to showing a straight path from the current location to the destination.

In some embodiments, one or more of the operations 504-510 may be performed by the network system 102. For example, the path module 224 can rank and chose the path to be displayed in operation 506. The UI module 226 can cause the display of the chosen path in operation 506, and the path module 224 or request module 222 can monitor the current location of the client device 106 (e.g., based on location traces received from the client device 106) in operation 508 and detect any deviations (operation 510).

FIG. 6 is an example screenshot of a user interface 600 displaying a navigable path 602 from a current location 604 of the user to a common destination 606. As shown, the path 602 is not a straight path from the current location 604 to the destination 606. Instead, the path 602 takes into consideration the environment (based on past user navigation to the same destination point). For example, the user may need to cross a road using a crosswalk and then follow a pathway to a specific pickup area.

While example embodiments are discussed above in two-dimensional space, example embodiments can take elevation into consideration. For example, example embodiments can detect if users are on different levels or floors and generate different polylines based on elevation.

Figure 7:
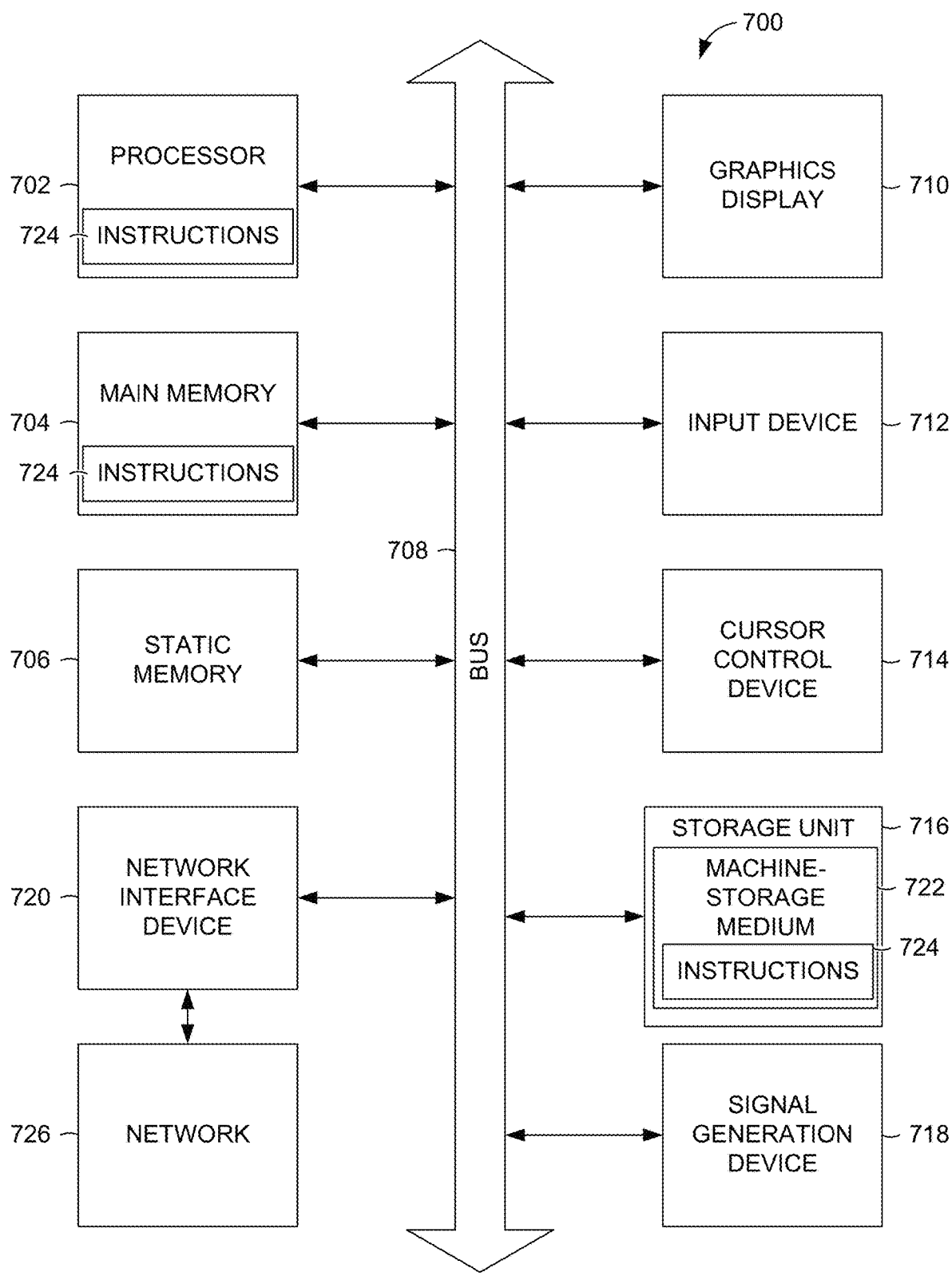
FIG. 7 is a block diagram illustrating components of a machine, according to some example embodiments, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3-5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), a short-range wireless input (e.g. Bluetooth), a local area networking receiver (e.g. Wifi), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for generating and presenting an optimized path using sequential location trace clustering. The method comprises receiving, by a network system, a request for a transportation service from a client device of a user, the request indicating a destination point and being associated with a start point, the start point corresponding to a location at a time the user requested the transportation service and the destination point corresponding to a pickup location; based on the start point and destination point, identifying, by a processor of the network system, one or more paths between the start point and the destination point, the one or more paths generated using sequential location trace clustering from previous transportation services involving the start point and the destination point; and causing, by the network system, presentation of a path of the one or more paths on a user interface on the client device of the user.

In example 2, the subject matter of example 1 can optionally include selecting the path of the one or more paths by ranking the one or more paths based on a predetermined criterion.

In example 3, the subject matter of any of examples 1-2 can optionally include monitoring a current location of the user as the user traverses the path; and causing the presentation of the path on the user interface to be updated based on the monitoring.

In example 4, the subject matter of any of examples 1-3 can optionally include detecting that the current location is a deviation from the path; determining whether a second path of the one or more paths is closer to the current location; and based on the determining, replacing at least a portion of the path with a portion of the second path on the user interface.

In example 5, the subject matter of any of examples 1-4 can optionally include performing the sequential location trace clustering, the performing comprising accessing aggregated data from previous transportation services; clustering origin points and destination points from the aggregated data; assigning location trace data from the aggregated data to their nearest clustered origin point and clustered destination point; grouping location traces data by origin-destination pairs; and generating a plurality of paths between the clustered origin point and clustered destination point for an origin-destination pair.

In example 6, the subject matter of any of examples 1-5 can optionally include partitioning a space between the clustered origin point and the clustered destination point for each origin-destination pair, wherein generating the plurality of paths comprises stitching together a clustered point in each partition with a closest clustered point in an adjacent partition.

In example 7, the subject matter of any of examples 1-6 can optionally include filtering the plurality of paths to ensure the plurality of paths are sufficiently coherent and distinct, the filtering being based on a minimum distance.

In example 8, the subject matter of any of examples 1-7 can optionally include wherein the identifying comprises accessing, from a data storage, the plurality of paths that correspond to the start point and the destination point of the request; and ranking the plurality of points that correspond to the start point and the destination point of the request to identify a top number of paths, the top number of paths being the one or more paths.

Example 9 is a system to generate and present an optimized path using sequential location trace clustering. The system comprises one or more hardware processors and a memory storing instructions that, when executed by the one or more hardware processors, cause the one or more hardware processors to perform operations comprising receiving a request for a transportation service from a client device of a user, the request indicating a destination point and being associated with a start point, the start point corresponding to a location at a time the user requested the transportation service and the destination point corresponding to a pickup location; based on the start point and destination point, identifying one or more paths between the start point and the destination point, the one or more paths generated using sequential location trace clustering from previous transportation services involving the start point and the destination point; and causing presentation of a path of the one or more paths on a user interface on the client device of the user.

In example 10, the subject matter of example 9 can optionally include wherein the operations further comprise selecting the path of the one or more paths by ranking the one or more paths based on a predetermined criterion.

In example 11, the subject matter of any of examples 9-10 can optionally include wherein the operations further comprise monitoring a current location of the user as the user traverses the path; and causing the presentation of the path on the user interface to be updated based on the monitoring.

In example 12, the subject matter of any of examples 9-11 can optionally include wherein the operations further comprise detecting that the current location is a deviation from the path; determining whether a second path of the one or more paths is closer to the current location; and based on the determining, replacing at least a portion of the path with a portion of the second path on the user interface.

In example 13, the subject matter of any of examples 9-12 can optionally include wherein the operations further comprise performing the sequential location trace clustering, the performing comprising accessing aggregated data from previous transportation services; clustering origin points and destination points from the aggregated data; assigning location trace data from the aggregated data to their nearest clustered origin point and clustered destination point; grouping location traces data by origin-destination pairs; and generating a plurality of paths between the clustered origin point and clustered destination point for an origin-destination pair.

In example 14, the subject matter of any of examples 9-13 can optionally include wherein the operations further comprise partitioning a space between the clustered origin point and the clustered destination point for each origin-destination pair, wherein generating the plurality of paths comprises stitching together a clustered point in each partition with a closest clustered point in an adjacent partition.

In example 15, the subject matter of any of examples 9-14 can optionally include wherein the operations further comprise filtering the plurality of paths to ensure the plurality of paths are sufficiently coherent and distinct, the filtering being based on a minimum distance.

In example 16, the subject matter of any of examples 9-15 can optionally include wherein the identifying comprises accessing, from a data storage, the plurality of paths that correspond to the start point and the destination point of the request; and ranking the plurality of points that correspond to the start point and the destination point of the request to identify a top number of paths, the top number of paths being the one or more paths.

Example 17 is a computer-storage medium comprising instructions which, when executed by one or more hardware processors of a machine, cause the machine to perform operations to generate and present an optimized path using sequential location trace clustering. The operations comprise receiving a request for a transportation service from a client device of a user, the request indicating a destination point and being associated with a start point, the start point corresponding to a location at a time the user requested the transportation service and the destination point corresponding to a pickup location; based on the start point and destination point, identifying one or more paths between the start point and the destination point, the one or more paths generated using sequential location trace clustering from previous transportation services involving the start point and the destination point; and causing presentation of a path of the one or more paths on a user interface on the client device of the user.

In example 18, the subject matter of example 17 can optionally include wherein the operations further comprise monitoring a current location of the user as the user traverses the path; and causing the presentation of the path on the user interface to be updated based on the monitoring.

In example 19, the subject matter of any of examples 17-18 can optionally include wherein the operations further comprise detecting that the current location is a deviation from the path; determining whether a second path of the one or more paths is closer to the current location; and based on the determining, replacing at least a portion of the path with a portion of the second path on the user interface.

In example 20, the subject matter of any of examples 17-19 can optionally include wherein the operations further comprise performing the sequential location trace clustering, the performing comprising accessing aggregated data from previous transportation services; clustering origin points and destination points from the aggregated data; assigning location trace data from the aggregated data to their nearest clustered origin point and clustered destination point; grouping location traces data by origin-destination pairs; and generating a plurality of paths between the clustered origin point and clustered destination point for an origin-destination pair Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
generating, based on aggregated data from previous transportation services, a plurality of paths between an origin corresponding to a start point and a destination corresponding to a destination point based on sequential location trace clustering using DBSAN or K-meanings clustering;
receiving, by a network system, a request for a transportation service from a client device of a user, the request indicating the destination point and being associated with the start point, the start point corresponding to a location at a time the user requested the transportation service and the destination point corresponding to a pickup location;
in response to receiving the request, identifying, based on the sequential location trace clustering using DBSAN or K-means clustering by a processor of the network system, the plurality of paths between the start point and the destination point;
selecting a path from the plurality of paths based on a ranking of the plurality of paths;
causing, by the network system, the client device to present the selected path of the plurality of paths on a user interface;
monitoring, in real-time via one or more sensors associated with the client device, a current location of the user as the user traverses the selected path;
detecting that the current location is a deviation from the selected path;
in response to the detecting, reranking the plurality of paths to determine a second path of the plurality of paths that is closer to the current location;
based on the reranking, replacing a portion of the selected path with a portion of the second path to generate an updated path; and
causing the client device to update the user interface to present the updated path.

2. The method of claim 1, further comprising:
ranking the plurality of paths based on a predetermined criterion.

3. The method of claim 1, further comprising performing the sequential location trace clustering, the performing comprising:
accessing aggregated data from previous transportation services;
clustering, using DBSCAN or K-means clustering, origin points and destination points from the aggregated data;
assigning location trace data from the aggregated data to their nearest clustered origin point and clustered destination point;
grouping location traces data by origin-destination pairs; and
generating a plurality of paths between the clustered origin point and clustered destination point for an origin-destination pair.

4. The method of claim 3, further comprising:
partitioning a space between the clustered origin point and the clustered destination point for each origin-destination pair, wherein generating the plurality of paths between the clustered origin point and clustered destination point comprises stitching together a clustered point in each partition with a closest clustered point in an adjacent partition.

5. The method of claim 4, wherein the partitioning comprises applying orthogonal planes through a line segment connecting the clustered origin point and the clustered destination point at every predetermined partition size.

6. The method of claim 3, further comprising filtering the plurality of paths between the clustered origin point and clustered destination point to ensure the plurality of paths between the clustered origin point and clustered destination point are sufficiently coherent and distinct, the filtering comprising:
  comparing within-partition distances between paths for given origin-destination pairs;
  determining that a distance between within-partition clustered points for two paths is not greater than a minimum distance; and
  based on determining that the distance is not greater than the minimum distance, filtering out one of the two paths.

7. The method of claim 3, wherein the identifying comprises:
  accessing, from a data storage, the plurality of paths that correspond to the start point and the destination point of the request; and
  ranking the plurality of paths that correspond to the start point and the destination point of the request to identify a top number of paths, the top number of paths being the one or more paths.

8. A system comprising:
  one or more hardware processors, and
  memory storing instructions that, when executed by the one or more hardware processors, cause the one or more hardware processors to perform operations comprising:
  generating, based on aggregated data from previous transportation services a plurality of paths between an origin corresponding to a start point and a destination corresponding to a destination point based on sequential location trace clustering using DBSAN or K-meanings clustering;
  receiving a request for a transportation service from a client device of a user, the request indicating the destination point and being associated with the start point, the start point corresponding to a location at a time the user requested the transportation service and the destination point corresponding to a pickup location;
  in response to receiving the request, identifying, based on the sequential location trace clustering using DBSAN or K-means clustering, the plurality of paths between the start point and the destination point;
  selecting a path from the plurality of paths based on a ranking of the plurality of paths;
  causing the client device to present the selected path of the plurality of paths on a user interface;
  monitoring, in real-time via one or more sensors associated with the client device, a current location of the user as the user traverses the selected path;
  detecting that the current location is a deviation from the selected path;
  in response to the detecting, reranking the plurality of paths to determine a second path of the plurality of paths that is closer to the current location;
  based on the reranking, replacing a portion of the selected path with a portion of the second path to generate an updated path; and
  causing the client device to update the user interface to present the updated path.

9. The system of claim 8, wherein the operations comprises:
  ranking the one or more plurality of paths based on a predetermined criterion.

10. The system of claim 8, wherein the operations further comprise performing the sequential location trace clustering, the performing comprising:
  accessing aggregated data from previous transportation services;
  clustering, using DBSCAN or K-means clustering, origin points and destination points from the aggregated data;
  assigning location trace data from the aggregated data to their nearest clustered origin point and clustered destination point;
  grouping location traces data by origin-destination pairs; and
  generating a plurality of paths between the clustered origin point and clustered destination point for an origin-destination pair.

11. The system of claim 10, wherein the operations further comprise:
  partitioning a space between the clustered origin point and the clustered destination point for each origin-destination pair, wherein generating the plurality of paths between the clustered origin point and clustered destination point comprises stitching together a clustered point in each partition with a closest clustered point in an adjacent partition.

12. The system of claim 11, wherein the partitioning comprises applying orthogonal planes through a line segment connecting the clustered origin point and the clustered destination point at every predetermined partition size.

13. The system of claim 10, wherein the operations further comprise filtering the plurality of paths between the clustered origin point and clustered destination point to ensure the plurality of paths between the clustered origin point and clustered destination point are sufficiently coherent and distinct, the filtering comprising:
  comparing within-partition distances between paths for given origin-destination pairs;
  determining that a distance between within-partition clustered points for two paths is not greater than a minimum distance; and
  based on determining that the distance is not greater than the minimum distance, filtering out one of the two paths.

14. The system of claim 10, wherein the identifying comprises:
  accessing, from a data storage, the plurality of paths that correspond to the start point and the destination point of the request; and
  ranking the plurality of paths that correspond to the start point and the destination point of the request to identify a top number of paths, the top number of paths being the one or more paths.

15. A machine-storage medium storing instructions that, when executed by one or more hardware processors of a machine, cause the machine to perform operations comprising:
  generating, based on aggregated data from previous transportation services, a plurality of paths between an origin corresponding to a start point and a destination corresponding to a destination point based on sequential location trace clustering using DBSAN or K-meanings clustering;
  receiving a request for a transportation service from a client device of a user, the request indicating the destination point and being associated with the start point, the start point corresponding to a location at a time the user requested the transportation service and the destination point corresponding to a pickup location;
  in response to receiving the request, identifying, based on the sequential location trace clustering using DBSAN or K-means clustering, the plurality of paths between the start point and the destination point;

selecting a path from the plurality of paths based on a ranking of the plurality of paths;

causing the client device to present the selected path of the plurality of paths on a user interface;

monitoring, in real-time via one or more sensors associated with the client device, a current location of the user as the user traverses the selected path;

detecting that the current location is a deviation from the selected path;

in response to the detecting, reranking the plurality of paths to determine a second path of the plurality of paths that is closer to the current location;

based on the reranking, replacing a portion of the selected path with a portion of the second path to generate an updated path; and causing the client device to update the user interface to present the updated path.

16. The machine-storage medium of claim 15, wherein the operations further comprise performing the sequential location trace clustering, the performing comprising:

accessing aggregated data from previous transportation services;

clustering, using DBSCAN or K-means clustering, origin points and destination points from the aggregated data;

assigning location trace data from the aggregated data to their nearest clustered origin point and clustered destination point;

grouping location traces data by origin-destination pairs; and generating a plurality of paths between the clustered origin point and clustered destination point for an origin-destination pair.

17. The machine-storage medium of claim 16, wherein the operations further comprise:

partitioning a space between the clustered origin point and the clustered destination point for each origin-destination pair, wherein the partitioning comprises applying orthogonal planes through a line segment connecting the clustered origin point and the clustered destination point at every predetermined partition size.

* * * * *

UNITED STATES PATENT AND TRADEMARK OFFICE
CERTIFICATE OF CORRECTION

PATENT NO. : 12,241,748 B2
APPLICATION NO. : 17/305854
DATED : March 4, 2025
INVENTOR(S) : Michael Charles Albada Page 1 of 1

It is certified that error appears in the above-identified patent and that said Letters Patent is hereby corrected as shown below:

In the Claims

In Column 21, Line 22, in Claim 8, delete "processors," and insert --processors;-- therefor In Column 21, Line 28, in Claim 8, after "services", insert --,--

In Column 21, Line 63, in Claim 9, before "plurality", delete "one or more"

In Column 22, Line 4, in Claim 10, delete "data," and insert --data;-- therefor

Signed and Sealed this
Twentieth Day of May, 2025

Coke Morgan Stewart
*Acting Director of the United States Patent and Trademark Office*